(No Model.)
W. C. WILSON.
LAND ROLLER.
No. 508,157. Patented Nov. 7, 1893.
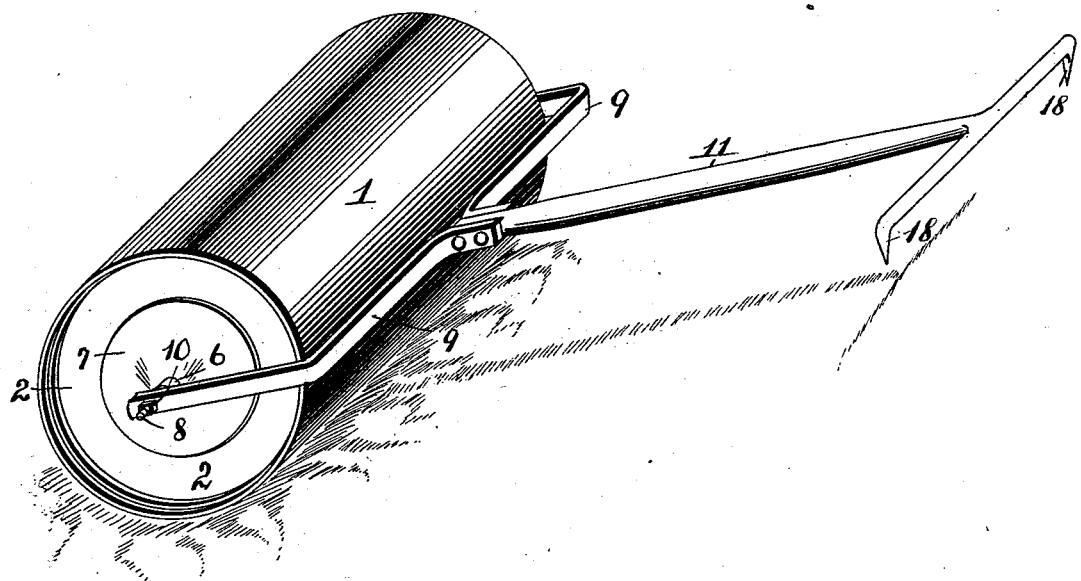
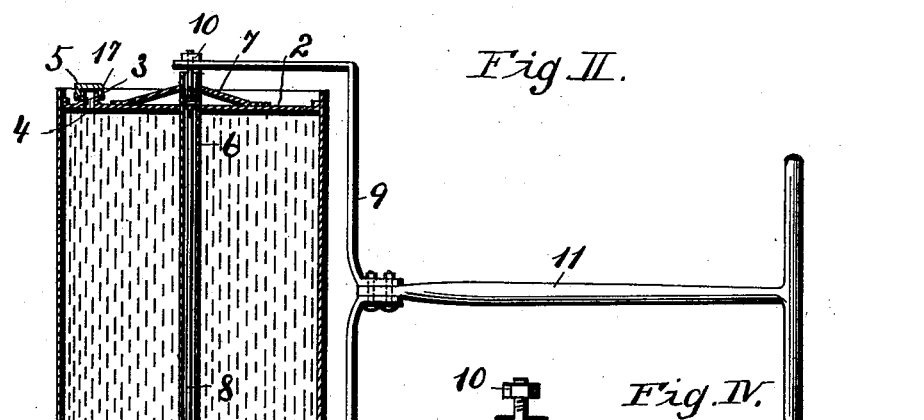
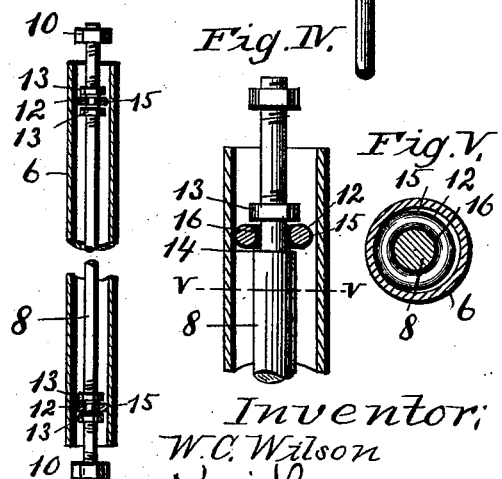
Witnesses:
F. G. Fischer
Walter E. Allen
Inventor:
W. C. Wilson
By King & Bros.
Attys.

UNITED STATES PATENT OFFICE.

WILLIAM C. WILSON, OF KANSAS CITY, MISSOURI, ASSIGNOR OF ONE-HALF TO JOHN R. FORAN AND WILLIAM H. EHLERS, OF SAME PLACE.

LAND-ROLLER.

SPECIFICATION forming part of Letters Patent No. 508,157, dated November 7, 1893.

Application filed September 12, 1892. Serial No. 445,678. (No model.)

*To all whom it may concern:*

Be it known that I, WILLIAM C. WILSON, of Kansas City, in the county of Jackson and State of Missouri, have invented certain new and useful Improvements in a Combined Roller and Oil-Tank, of which the following is a full, clear, and exact description, reference being had to the accompanying drawings, which form a part of this specification.

My invention relates to certain new and useful improvements in a "combined roller and oil tank;" and my invention consists in certain features of novelty hereinafter described and pointed out in the claims.

Figure I, is a perspective of my improved roller, showing handle attached thereto. Fig. II, is a longitudinal section of the same. Fig. III, is an enlarged detail section showing the manner of connecting the handle with the roller. Fig. IV, is a modification showing bearing of roller shaft. Fig. V, is a section taken on line V, V, Fig. IV.

Referring to the drawings: 1, represents a roller preferably formed of metal and made cylindrical in form, having heads 2, at each of its ends, whereby the same is made water-tight. In one of the heads 2, is a nipple 3, having an opening 4, and a screw-cap 5, which may be secured to said nipple for closing said opening.

6, represents a tube extending longitudinally through the center of the roller, said tube being open throughout its length, the ends of said tube extending beyond the outer line of the cylinder, and having disks 7, for bracing the ends of the tube, said disks being connected with the heads 2.

8, represents a shaft extending through the tube 6, and a slight distance beyond the ends of said tube to which is secured the bent bars 9, by means of nuts 10, on the ends of said shaft. To the bars 9, may be secured a handle 11, for use on the hand roller, or a tongue or other means of motor power may be secured to said bars 9, where it is desired to use a larger roller; for instance, a farm roller or a street roller.

12, represents anti-friction rollers mounted on the shaft 8, said anti-friction rollers forming a bearing between the shaft 8, and the tube 6, said rollers 12, being loosely mounted on the shaft 8, so that as the roller is operated the anti-friction rollers will turn on the shaft 8, and at the same time turn in the tube 6, making a frictionless bearing for the shaft. The anti-friction rollers 12, are held in the proper position by means of jam nuts 13.

In my modification, as shown in Fig. IV, I do away with the inner jam nuts, and in lieu thereof, provide shoulders 14, on the shaft 8, which limit the inward movement of the anti-friction rollers 12, the outward movement of the same being limited by the jam nut 13. Each roller 12, is provided with a rounded outer surface, 15, which bears against the tube 6, and with a rounded inner surface 16, which bears against the shaft 8, thereby forming a narrow frictionless bearing.

The cylinder 1, is provided with flanges 17, at its outer ends extending a short distance beyond the heads 2, the flange at one end of the cylinder protecting the nipple 3. Through the opening 4, in the nipple 3, I introduce into the hollow cylinder water or other suitable liquid for adding weight to the roller, introducing enough liquid to make the weight of roller desired. I am thus enabled to make a roller very light in weight, and by filling it with liquid obtain the weight of a very heavy roller, while at the same time the liquid contained within the roller will aid in the rotation of the same, forming a live weight instead of a dead weight; and as the roller is moved either forward or backward the liquid will move therewith, always changing its center of gravity and assisting in moving the roller by forming a weight on its forward or rear portion, according to the direction in which the roller is moved. When it is not desired to use the cylinder for a roller it can be used for an oil tank or other liquid containing vessel.

18 represents downwardly extending points on the handle 11. When it is desired to stop the roller on an incline, or to hold the cylinder while filling with or extracting the liquid all that it is necessary to do is to drop the handle when the points enter the ground and hold the roller stationary.

I claim as my invention—

1. The combination of a hollow cylinder for containing liquid; a tube extending through said cylinder; a shaft extending through said tube; said shaft having anti-friction rollers for forming a bearing between the shaft and tube, and a handle or tongue connected with said shaft; substantially as and for the purpose set forth.

2. The combination of a hollow cylinder for containing a liquid; a tube extending through said cylinder; a shaft extending through said tube; a handle or tongue connected with said shaft; anti-friction rollers forming a bearing between said shaft and tube and means for holding said anti-friction rollers in position; substantially as and for the purpose set forth.

3. The combination of a hollow cylinder for containing liquid; a tube extending through said cylinder; a shaft extending through said tube; a handle or tongue connected with said shaft; shoulders 14, on said shaft; anti-friction rollers 12, having rounded bearing against said shaft and tube, and jam nuts for holding said anti-friction rollers in proper position from outward movement on said shaft; substantially as and for the purpose set forth.

4. An anti-frictional bearing, consisting of a tube, a shaft extending through the tube; rollers mounted loosely on said shaft and forming a bearing between the shaft and tube, and means for holding said rollers on said shaft; substantially as and for the purpose set forth.

5. An anti-friction bearing consisting of a tube; a shaft extending through said tube; a roller loosely mounted on said shaft, having a rounded bearing surface in contact with the shaft and a rounded bearing surface in contact with the tube, and means for holding said roller on said shaft; substantially as and for the purpose set forth.

6. The combination of a hollow cylinder for containing liquid; a tube extending through said cylinder; a shaft extending through said tube and having an anti-friction bearing within the same; a handle connected with said shaft; and downwardly extending points on said handle for holding the roller in a stationary position; substantially as described and for the purpose set forth.

WILLIAM C. WILSON.

Witnesses:
JAS. E. KNIGHT,
F. E. MULLETT.